US008911111B2

(12) United States Patent
Gao et al.

(10) Patent No.: US 8,911,111 B2
(45) Date of Patent: Dec. 16, 2014

(54) LED BACKLIGHT SYSTEM AND DISPLAY DEVICE

(75) Inventors: Xinming Gao, Shenzhen (CN); Fei Li, Shenzhen (CN); Xiang Yang, Shenzhen (CN)

(73) Assignee: Shenzhen China Star Optoelectronics Technology, Co., Ltd., Shenzhen, Guangdong (CN)

( * ) Notice: Subject to any disclaimer, the term of this patent is extended or adjusted under 35 U.S.C. 154(b) by 338 days.

(21) Appl. No.: 13/521,712

(22) PCT Filed: Jun. 11, 2012

(86) PCT No.: PCT/CN2012/076683
§ 371 (c)(1),
(2), (4) Date: Jul. 11, 2012

(87) PCT Pub. No.: WO2013/181853
PCT Pub. Date: Dec. 12, 2013

(65) Prior Publication Data
US 2013/0322059 A1  Dec. 5, 2013

(30) Foreign Application Priority Data
Jun. 5, 2012 (CN) .......................... 2012 1 0183306

(51) Int. Cl.
*H05B 37/04* (2006.01)
*H05B 37/00* (2006.01)
(52) U.S. Cl.
USPC ...................... 362/249.05; 315/125; 315/306

(58) Field of Classification Search
USPC .............. 362/249.05; 315/119–128, 291–311
See application file for complete search history.

(56) References Cited

U.S. PATENT DOCUMENTS

| 2011/0043114 | A1* | 2/2011 | Hsu et al. | 315/119 |
|---|---|---|---|---|
| 2011/0169423 | A1* | 7/2011 | Huang et al. | 315/297 |
| 2011/0309758 | A1* | 12/2011 | Yu et al. | 315/192 |
| 2012/0112643 | A1* | 5/2012 | Lin | 315/185 R |
| 2012/0319587 | A1* | 12/2012 | Pokrajac | 315/122 |
| 2013/0285625 | A1* | 10/2013 | Ge et al. | 323/234 |

* cited by examiner

*Primary Examiner* — Karabi Guharay
*Assistant Examiner* — Nathaniel Lee
(74) *Attorney, Agent, or Firm* — Andrew C. Cheng

(57) ABSTRACT

The present invention provides an LED backlight system and display device. Backlight system includes power source module, LED array, master switch module, current detection module, current equalizer module and current shunt module. LED array is connected to power source module and includes LED strings with common anode. Master switch module includes first switch transistors for receiving switch control PWM signal of LED strings. Current detection module outputs current feedback signals corresponding to currents of LED strings. Current equalizer module is connected to current detection and includes equalizer control unit and equalizer switch unit. Based on current feedback signal, equalizer control unit controls on-and-off of equalizer switch unit. Current shunt module is connected in parallel with current equalizer module and performs current shunt on current equalizer module. As such, the present invention reduces energy-consumption of current equalizer module and temperature of LED drive chip.

20 Claims, 3 Drawing Sheets

US 8,911,111 B2

LED BACKLIGHT SYSTEM AND DISPLAY DEVICE

BACKGROUND OF THE INVENTION

1. Field of the Invention

The present invention relates to the field of liquid crystal displaying techniques, and in particular to an LED backlight system and display device.

2. The Related Arts

At present, known backlight systems include LED string and backlight drive circuit for driving LED string, wherein backlight drive circuit mainly includes light source and LED drive chip. Light source only outputs a voltage for supplying power to LED string. When voltage difference of LED string is different, LED drive chip controls voltage drops on connected equalizer switch to make voltage on resistor connected to equalizer switch stable so as to make current passing each LED string constant.

However, because current between LED strings will be added on equalizer switch to cause more energy-consumption by equalizer switch, if equalizer switch is disposed inside LED drive chip, temperature of LED drive chip will be too high to restrict the application of LED drive chip. Even with externally disposed equalizer switch, the manufacture cost will increase due to equalizer switch requiring specification of higher current.

SUMMARY OF THE INVENTION

The technical issue to be addressed by the present invention is to provide an LED backlight system and display device to reduce temperature of LED drive chip.

The present invention provides an LED backlight system, which comprises: a power source module, for supplying power; an LED array, electrically connected to the power source, comprising a plurality of LED strings with common anode. The LED backlight system further comprises: a master switch module, comprising a plurality of first switch transistors, each of the plurality of first switch transistors being serially connected respectively to corresponding LED string for receiving switch control PWM signal of LED string to control the on-and-off of each LED string; a current detection module, serially connected to current loop of LED string, for outputting a plurality of current feedback signals of LED strings; a current equalizer module, connected to current detection module, the current equalizer module comprising equalizer control unit and equalizer switch unit connected to the equalizer control unit; wherein equalizer switch unit further comprising a plurality of second switch transistors, each of the plurality of second switch transistors being disposed correspondingly to each of LED strings; equalizer control unit comprising a plurality of comparators, each of comparators being disposed correspondingly to each of LED strings; enabling terminals of the plurality of comparators receiving switch control PWM signals of LED strings, non-inverting inputs of comparators receiving same reference voltage signal, inverting inputs of comparators respectively receiving current feedback signal outputted by current detection module, output of each comparator outputting control signal for current equalization of LED string to control on-and-off of second switch transistor to control impedance of current loop of each LED string so as to control illumination of each LED string; a current shunt module, connected in parallel with current equalizer module, wherein current shunt module comprising equal number of shunt resistors as number of LED strings, first end of each of shunt resistors being connected in parallel with drain terminal of second switch transistor of corresponding LED string, second end of each of shunt resistors being connected in parallel with source terminal of second switch transistor corresponding to each LED string for performing current shunt on current equalizer module.

The present invention provides an LED backlight system, which comprises: a power source module, for supplying power; an LED array, electrically connected to the power source, comprising a plurality of LED strings with common anode. The LED backlight system further comprises: a master switch module, comprising a plurality of first switch transistors, each of the plurality of first switch transistors being serially connected respectively to corresponding LED string for receiving switch control PWM signal of LED string to control the on-and-off of each LED string; a current detection module, serially connected to current loop of LED string, for outputting a plurality of current feedback signals of LED strings; a current equalizer module, connected to current detection module, the current equalizer module comprising equalizer control unit and equalizer switch unit connected to the equalizer control unit; wherein equalizer control unit, based on current feedback signal to control on-and-off of equalizer switch unit to control impedance of current loop of each LED string so as to control illumination of each LED string; a current shunt module, connected in parallel with current equalizer module, for performing current shunt on current equalizer module.

The present invention provides a display device, which comprises: a display panel and a backlight system, wherein the backlight system comprising: a power source module, for supplying power; an LED array, electrically connected to the power source, comprising a plurality of LED strings with common anode. The LED backlight system further comprises: a master switch module, comprising a plurality of first switch transistors, each of the plurality of first switch transistors being serially connected respectively to corresponding LED string for receiving switch control PWM signal of LED string to control the on-and-off of each LED string; a current detection module, serially connected to current loop of LED string, for outputting a plurality of current feedback signals of LED strings; a current equalizer module, connected to current detection module, the current equalizer module comprising equalizer control unit and equalizer switch unit connected to the equalizer control unit; wherein equalizer control unit, based on current feedback signal to control on-and-off of equalizer switch unit to control impedance of current loop of each LED string so as to control illumination of each LED string; a current shunt module, connected in parallel with current equalizer module, for performing current shunt on current equalizer module.

The efficacy of the present invention is that to be distinguished from the state of the art. The present invention disposes a plurality of first switch transistors for receiving PWM signal to control on-and-off of LED strings so as to control on-and-off of LED strings; current detection module, for outputting a plurality of feedback signals corresponding to currents of LED strings; current equalizer module, comprising equalizer control unit and equalizer switch unit connected to the equalizer control unit; wherein equalizer control unit, based on current feedback signal to control on-and-off of equalizer switch unit to control impedance of current loop of each LED string so as to control illumination of each LED string; a current shunt module, connected in parallel with current equalizer module, for performing current shunt on current equalizer module. Through the aforementioned disposition, the present invention reduces energy-consumption of current equalizer module and leading to temperature reduction of LED drive chip.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

Figure 1:
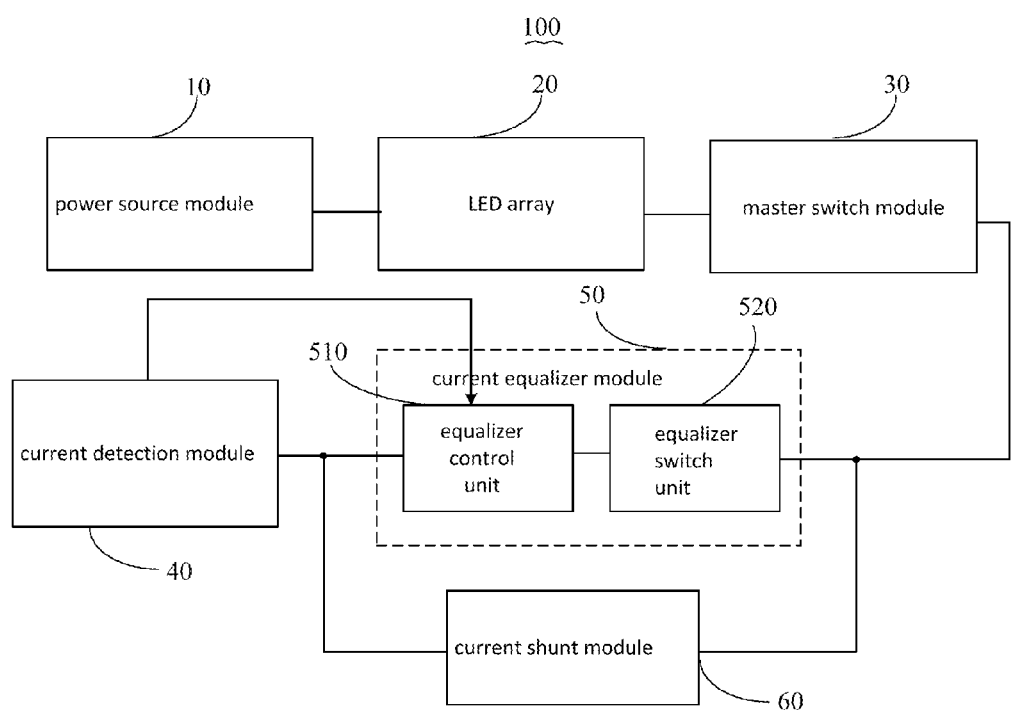
FIG. 1 is a schematic view showing the structure of an LED backlight system according to the present invention.

Referring to FIG. 1, FIG. 1 is a schematic view showing the structure of an LED backlight system according to the present invention. As shown in FIG. 1, LED backlight system 100 according to the present invention comprises a power source module 10, an LED array 20, a master switch module 30, a current detection module 40, a current equalizer module 50 and a current shunt module 60.

In the instant embodiment, power source module 10 is for supplying power. LED array 20 is electrically connected to power source module 10, and comprises a plurality of LED strings.

Master switch module 30 is for providing switch control signal of LED strings of LED array 20 to control on-and-off of LED strings.

Current detection module 40 is serially connected to current loop of LED strings of LED array 20, for outputting a plurality of feedback signals corresponding to currents of LED strings. Current equalizer module 50 is connected to current detection module 40, current equalizer module 50 comprises equalizer control unit 510 and equalizer switch unit 520, connected to the equalizer control unit 510. Equalizer control unit 510, based on current feedback signal from current detection module 40 to control on-and-off of equalizer switch unit 520 to control impedance of current loop of each LED string of LED array 20 so as to control illumination of each LED string.

Current shunt module 60 is connected in parallel with current equalizer module 50, for performing current shunt on current equalizer module 50 to reduce current flowing through equalizer switch unit 520 so as to control energy-consumption of current equalizer module 50 and reduce temperature of LED drive chip.

Figure 2:
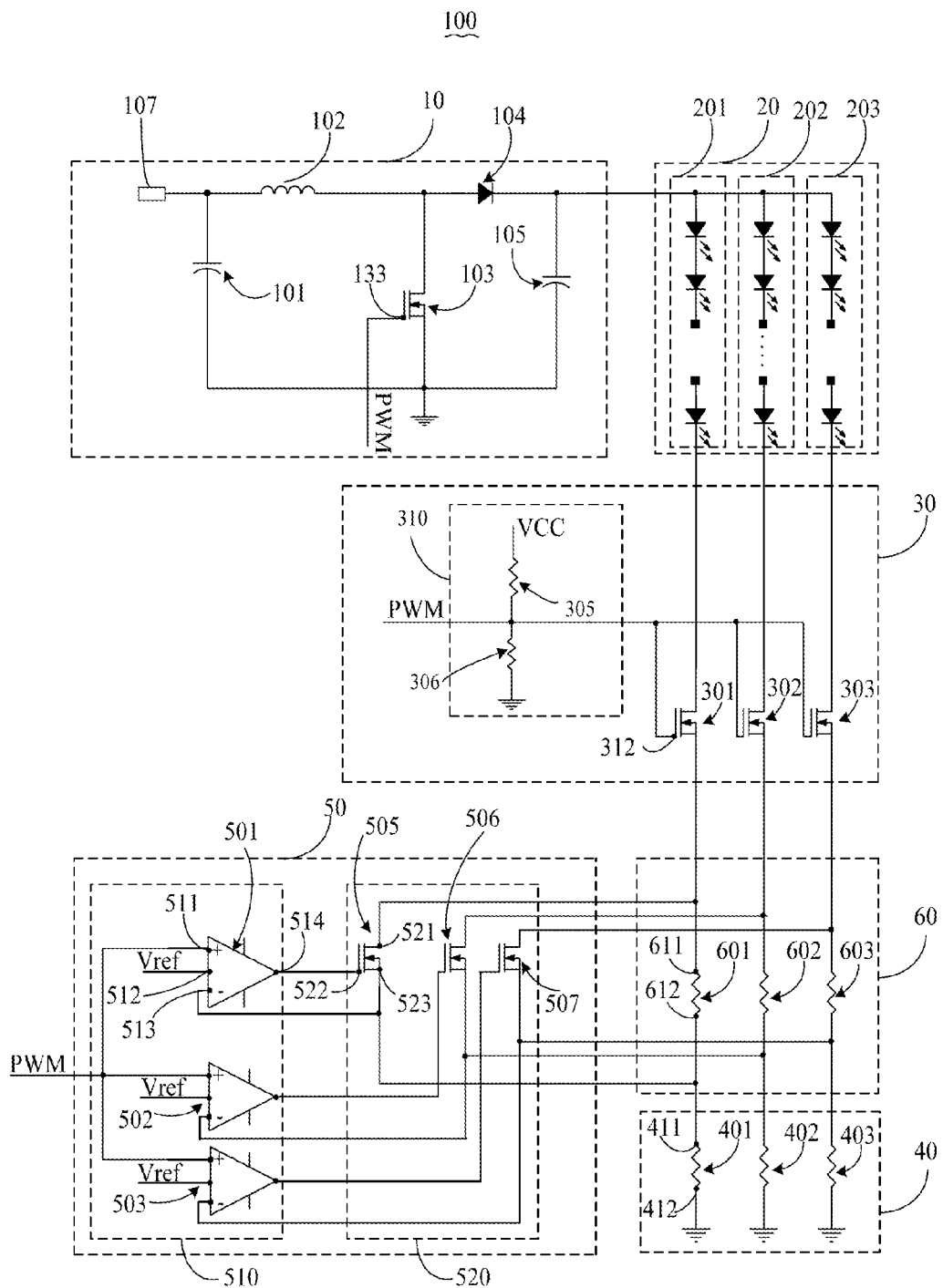
FIG. 2 is a schematic view showing the structure of a specific embodiment of the LED backlight system according to the present invention.

Specifically, referring to FIG. 2, FIG. 2 is a schematic view showing the structure of a specific embodiment of the LED backlight system according to the present invention.

In the instant embodiment, power source module 10 is for supplying power. In the present embodiment, power source module 10 is a BOOST circuit, comprising: power source 107, first capacitor 101, inductor 102, third switch transistor 103, diode 104 and second capacitor 105. Specifically, first end of first capacitor 101 is connected to first end of power source 107 and first end of inductor 102. Second end of capacitor 101 is grounded. Second end of inductor 102 is connected to drain terminal of third switch transistor 103 and anode of diode 104. Control terminal 133 of third switch transistor 103 receives PWM signal for controlling power source switch, and source terminal of third switch transistor 103 is grounded. Cathode of diode 104 is connected to first end of second capacitor 105 and LED array 20. Second end of second capacitor 105 is grounded.

LED array 20 is electrically connected to power source module 10. In the instant embodiment, LED array 20 comprises a plurality of LED strings with common anode; as shown in FIG. 2, LED strings 201, 202, 203.

In the instant embodiment, master switch module 30 comprises a plurality of first switch transistors, as shown in FIG. 2, first switch transistors 301, 302, 303, for receiving switch control PWM signal of LED strings 201, 202, 203, to control on-and-off of corresponding LED strings.

In the instant embodiment, each of first switch transistors is connected and operates in the same manner. Therefore, the following only describes the connection and operation of first switch transistor 301.

First switch transistor 301 is for controlling on-and-off of corresponding LED string 201. Control end 312 of first switch transistor 301 receives switch control PWM signal of LED string 201, drain terminal of first switch transistor 301 is connected to LED string 201, and source terminal of first switch transistor 301 is connected to current shunt module 60.

In the instant embodiment, master switch module further comprises master switch module control circuit 310. Master switch module control circuit 310 comprises voltage source VCC, pull-up resistor 305 and pull-down resistor 306, wherein output end of voltage source VCC is connected to first end of pull-up resistor 304, second end of pull-up resistor 305 is connected to first end of pull-down resistor 306 and control end 312 of first switch transistor 301, and second end of pull-down transistor is grounded.

In the instant embodiment, before voltage source VCC of the system reaches steady, first switch transistor 301 is off and no current flows through LED string 201, and thus no illumination. Or, when switch control PWM signal of LED string is low, first switch transistor 301 is off and LED string 201 does not illuminate.

Current shunt module 60 is connected in parallel with current equalizer module 50 for performing current shunt on current equalizer module 50. In the present embodiment, current shunt module 60 comprises equal number of shunt resistors to number of LED strings, as shown in FIG. 2, shunt resistors 601, 602, 603.

In the instant embodiment, connection and operation of each shunt resistor is identical; thus, only shunt resistor 601 is described here.

Specifically, first end 611 of shunt resistor 601 is connected in parallel with drain terminal 521 of second switch transistor 505. Second end 612 of shunt resistor 601 is connected in parallel with source terminal 523 of second switch transistor 505. Furthermore, first end 611 of shunt resistor 601 is connected to source terminal 523 of first switch transistor 301.

Current detection module 40 is serially connected to current loop of LED string for outputting a plurality of current feedback signals corresponding to currents of LED strings. In the present embodiment, current detection module 40 comprises equal number of detection resistors to number LED strings, as shown in FIG. 2, detection resistors 401, 402, 403.

In the instant embodiment, connection and operation of each detection resistor is identical; thus, only detection resistor 401 is described here.

Specifically, first end 411 of detection resistor 401 is connected to second end 612 of shunt resistor 601, and second end 412 of detection resistor 401 is grounded; wherein first end 411 of detection resistor 401 provides a current feedback signal of LED string 201. In more details, voltage on detection resistor 401 is current feedback signal of LED string 201, which is proportional to current flowing through LED string 201.

In the instant embodiment, current equalizer module 50 is disposed inside LED drive chip, comprising equalizer control unit 510 and equalizer switch unit 520, connected to equalizer control unit 510.

In the instant embodiment, equalizer control unit 510 comprises a plurality of comparators with enabling terminal, as shown in FIG. 2, comparators 501, 502, 503. Each of comparators is disposed correspondingly to each of LED strings.

In the instant embodiment, connection and operation of each comparator is identical; thus, only comparator 501 is described here.

Specifically, enabling terminal 511 of comparator 501 receives switch control PWM signal of LED string 201. Non-inverting input 512 of comparator 501 receives same reference voltage signal Vref, and inverting input 513 of comparator 501 is connected to first end 411 of detection resistor 401 for receiving current feedback signal of outputted by detection resistor 401. Output 514 of comparator 501 outputs current equalization control signal of LED string 201.

In the instant embodiment, equalizer switch unit 520 comprises a plurality of second switch transistors, each disposed correspondingly to each of LED strings, as shown in FIG. 2, second switch transistors 505, 506, 507.

In the instant embodiment, connection and operation of each second switch transistor is identical; thus, only second switch transistor 505 is described here.

Specifically, drain terminal 521 of second switch transistor 505 is connected to source terminal of first switch transistor 301. Source terminal 523 of second switch transistor 505 is connected to current detection module 60. Control terminal 522 of second switch transistor 505 is connected to output 514 of comparator 501.

In the present embodiment, first switch transistors 301, 302, 303, second switch transistors 505, 506, 507, and third switch transistor 103 are all N-channel MOS transistors (NMOS). Control terminal of each of first switch transistors, second switch transistors and third transistor is gate terminal of N-channel MOS transistor.

The following describes operation theory of LED backlight system 100 of the present embodiment. Because the theory of each LED string is identical; thus, only LED string 201 is described here.

Specially, when power switch control PWM signal received by control terminal 133 of third switch transistor 103 is high, third switch transistor 103 is on (i.e., conductive). First capacitor 101 filters current outputted by power source 107, and inductor 102 stores current energy. At this point, diode 104 is to prevent current from reverse flowing. When power switch control PWM signal received by control terminal 133 of third switch transistor 103 is low, third switch transistor 103 is off (i.e. cut off). At this point, current stored in inductor 102 flows through diode 104 and filtered by second capacitor 105 to enter LED string 201.

When power switch control PWM signal received by control terminal 312 of first switch transistor 301 is low, voltage at control terminal 312 of first switch transistor 301 is pulled down so that first switch transistor 301 is off and LED string 201 is not operating. When switch control PWM signal of LED string 201 is high, voltage at control terminal 312 of first switch transistor 301 is pulled up so that first switch transistor 301 is on and LED string 201 starts operating.

In the instant embodiment, voltage drop caused by current of LED string 201 in current detection resistor 401 is used as a current feedback signal proportional to LED string 201 current to input to inverting 513 of comparator 501. Comparator 501 compares the current feedback signal with reference voltage signal Vref, and outputs current equalization control signal of LED string 201. As such, the current equalization control signal is used to control on-and-off of second switch transistor 505 so as to control impedance of current loop of LED string 201, leading to controlling illumination of LED string 201.

Shunt resistor 601 connected performs current shunt on second switch transistor 505 to reduce current flowing through second switch transistor 505, so as to control energy-consumption of current equalizer module 50 and reduce temperature of LED drive chip.

In the instant embodiment, switch control PWM signal of LED string 201 received by comparator 501 is synchronous with switch control PWM signal of LED string 201 received by first switch transistor 301. Therefore, after VCC reaches steady, switch control PWM signal of LED string 201 received by first switch transistor 301 is high, LED string 201 starts operating and comparator 501 also start to operate.

When LED string 201 displays a brighter state, voltage corresponding to current feedback signal provided by detection resistor 401 is larger. When the voltage is larger than reference voltage Vref received by comparator 501, comparator 501 outputs a low voltage signal and second switch transistor 505 is off so that impedance of LED string 201 circuit increases, and leads to less current flowing through LED string 201 and the brighter state of illumination being reduced. Because the current flowing through LED string 201 does not flow through second switch transistor 505, but flows through shunt resistor 601, shunt resistor 601 achieves the shunt function to prevent second switch transistor 505 from larger current, and reduces energy-consumption of current equalizer module 50 and temperature of LED drive chip.

When LED string 201 displays a darker state, voltage corresponding to current feedback signal provided by detection resistor 401 is smaller. When the voltage is smaller than reference voltage Vref received by comparator 501, comparator 501 outputs a high voltage signal and second switch transistor 505 is on. Because shunt resistor 601 is connected to second switch transistor 505 in parallel, impedance of LED string 201 circuit decreases, and leads to more current flowing through LED string 201 and the darker state of illumination being raised.

In the instant embodiment, ration of resistance of shunt resistor and saturated conductive impedance of second switch transistor is preferably in the range of 0.5-2.

Figure 3:
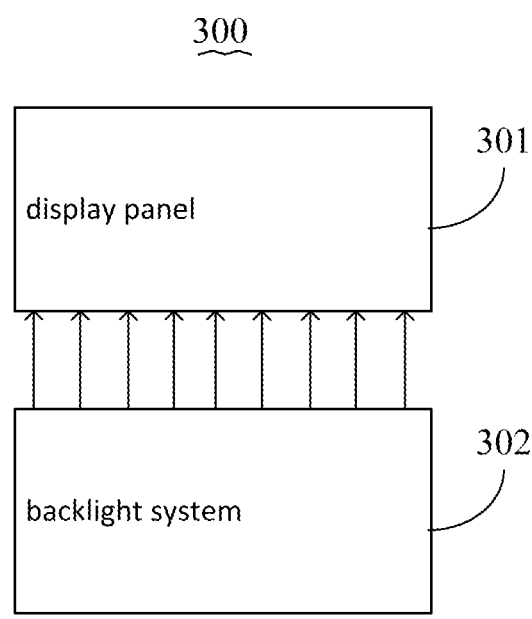
FIG. 3 is a schematic view showing the structure of a display device according to the present invention.

Referring to FIG. 3, FIG. 3 is a schematic view showing the structure of a display device according to the present invention. As shown in FIG. 3, display device 300 of the present invention comprise display panel 301 and backlight system 302, wherein backlight system 302 supplies light to display panel 301.

In the present embodiment, backlight system 302 can be any embodiments of LED backlight system 100 described in FIG. 1 and FIG. 2.

In summary, the present invention uses shunt module to perform shunt on equalizer switch unit to reduce current flowing through equalizer switch unit, reduces energy-consumption of current equalizer module and reduces temperature of LED drive chip.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. An LED backlight system, which comprises:
a power source module, for supplying power;
an LED array, electrically connected to the power source, comprising a plurality of LED strings with common anode;
wherein the LED backlight system further comprising:
a master switch module, comprising a plurality of first switch transistors, each of the plurality of first switch transistors being serially connected respectively to corresponding LED string for receiving switch control PWM signal of LED string to control the on-and-off of each LED string;
a current detection module, serially connected to current loop of LED string, for outputting a plurality of current feedback signals of LED strings;
a current equalizer module, connected to current detection module, the current equalizer module comprising equalizer control unit and equalizer switch unit connected to the equalizer control unit; wherein equalizer switch unit further comprising a plurality of second switch transistors, each of the plurality of second switch transistors being disposed correspondingly to each of LED strings; equalizer control unit comprising a plurality of comparators, each of comparators being disposed correspondingly to each of LED strings; enabling terminals of the plurality of comparators receiving switch control PWM signals of LED strings, non-inverting inputs of comparators receiving same reference voltage signal, inverting inputs of comparators respectively receiving current feedback signal outputted by current detection module, output of each comparator outputting control signal for current equalization of LED string to control on-and-off of second switch transistor to control impedance of current loop of each LED string so as to control illumination of each LED string; and
a current shunt module, connected in parallel with current equalizer module, wherein current shunt module comprising equal number of shunt resistors as number of LED strings, first end of each of shunt resistors being connected in parallel with drain terminal of second switch transistor of corresponding LED string, second end of each of shunt resistors being connected in parallel with source terminal of second switch transistor corresponding to each LED string for performing current shunt on current equalizer module.

2. The LED backlight system as claimed in claim 1, characterized in that current detection module comprises equal number of detection resistors as number of LED strings, first end of each of detection resistors is connected to corresponding shunt resistor, and second end of each of detection resistors is grounded, wherein first end of each of detection resistors provides a current feedback signal of LED string.

3. An LED backlight system, which comprises:
a power source module, for supplying power;
an LED array, electrically connected to the power source, comprising a plurality of LED strings with common anode, the LED backlight system further comprising:
a master switch module, comprising a plurality of first switch transistors, each of the plurality of first switch transistors being serially connected respectively to corresponding LED string for receiving switch control PWM signal of LED string to control the on-and-off of each LED string;
a current detection module, serially connected to current loop of LED string, for outputting a plurality of current feedback signals of LED strings;
a current equalizer module, connected to current detection module, the current equalizer module comprising equalizer control unit and equalizer switch unit connected to the equalizer control unit; wherein equalizer control unit, based on current feedback signal to control on-and-off of equalizer switch unit to control impedance of current loop of each LED string so as to control illumination of each LED string; and
a current shunt module, connected in parallel with current equalizer module, for performing current shunt on current equalizer module.

4. The LED backlight system as claimed in claim 3, characterized in that the equalizer control unit further comprises: a plurality of comparators, each of comparators being disposed correspondingly to each of LED strings; enabling terminals of the plurality of comparators receiving switch control PWM signals of LED strings, non-inverting inputs of comparators receiving same reference voltage signal, inverting inputs of comparators respectively receiving current feedback signal outputted by current detection module, output of each comparator outputting control signal for current equalization of LED string to control on-and-off of second switch transistor to control impedance of current loop of each LED string so as to control illumination of each LED string.

5. The LED backlight system as claimed in claim 4, characterized in that the equalizer switch unit further comprises: a plurality of second switch transistors, each of the plurality of second switch transistors being disposed correspondingly to each of LED strings, drain terminal of second switch transistor being connected to source terminal of first switch transistor; source terminal of second switch transistor being connected to current detection module; control terminal of second switch transistor being connected to output of comparator, for receiving current equalization control signal of LED string outputted by comparator, and based on current equalization control signal of LED string to control on-and-off of second switch transistor.

6. The LED backlight system as claimed in claim 5, characterized in that current shunt module comprises equal number of shunt resistors as number of LED strings, first end of each of shunt resistors is connected in parallel with drain terminal of second switch transistor of corresponding LED string, second end of each of shunt resistors is connected in parallel with source terminal of second switch transistor corresponding to each LED string.

7. The LED backlight system as claimed in claim 6, characterized in that ration of resistance of shunt resistor and saturated conductive impedance of second switch transistor is in the range of 0.5-2.

8. The LED backlight system as claimed in claim 6, characterized in that current detection module comprises equal number of detection resistors as number of LED strings, first end of each of detection resistors is connected to corresponding shunt resistor, and second end of each of detection resistors is grounded, wherein first end of each of detection resistors provides a current feedback signal of LED string.

9. The LED backlight system as claimed in claim 8, characterized in that the first switch transistor and the second switch transistor are N-channel MOS transistors.

10. The LED backlight system as claimed in claim 3, characterized in that control end of first switch transistor receives switch control PWM signal of LED string, and when switch control PWM signal of LED string is low, voltage at control terminal of first switch transistor is pulled down so that first switch transistor is off; when switch control PWM signal of LED string is high, voltage at control terminal of first switch transistor is pulled up so that first switch transistor is on.

11. The LED backlight system as claimed in claim 3, characterized in that the power source module is a BOOST circuit.

12. A display device, which comprises: a display panel and a backlight system;
wherein the backlight system further comprises:
a power source module, for supplying power;
an LED array, electrically connected to the power source, comprising a plurality of LED strings with common anode, the LED backlight system further comprising:
a master switch module, comprising a plurality of first switch transistors, each of the plurality of first switch transistors being serially connected respectively to corresponding LED string for receiving switch control PWM signal of LED string to control the on-and-off of each LED string;
a current detection module, serially connected to current loop of LED string, for outputting a plurality of current feedback signals of LED strings;
a current equalizer module, connected to current detection module, the current equalizer module comprising equalizer control unit and equalizer switch unit connected to the equalizer control unit; wherein equalizer control unit, based on current feedback signal to control on-and-off of equalizer switch unit to control impedance of current loop of each LED string so as to control illumination of each LED string; and
a current shunt module, connected in parallel with current equalizer module, for performing current shunt on current equalizer module.

13. The display device as claimed in claim 12, characterized in that the equalizer control unit further comprises: a plurality of comparators, each of comparators being disposed correspondingly to each of LED strings; enabling terminals of the plurality of comparators receiving switch control PWM signals of LED strings, non-inverting inputs of comparators receiving same reference voltage signal, inverting inputs of comparators respectively receiving current feedback signal outputted by current detection module, output of each comparator outputting control signal for current equalization of LED string to control on-and-off of second switch transistor to control impedance of current loop of each LED string so as to control illumination of each LED string.

14. The display device as claimed in claim 13, characterized in that the equalizer switch unit further comprises: a plurality of second switch transistors, each of the plurality of second switch transistors being disposed correspondingly to each of LED strings, drain terminal of second switch transistor being connected to source terminal of first switch transistor; source terminal of second switch transistor being connected to current detection module; control terminal of second switch transistor being connected to output of comparator, for receiving current equalization control signal of LED string outputted by comparator, and based on current equalization control signal of LED string to control on-and-off of second switch transistor.

15. The display device as claimed in claim 14, characterized in that current shunt module comprises equal number of shunt resistors as number of LED strings, first end of each of shunt resistors is connected in parallel with drain terminal of second switch transistor of corresponding LED string, second end of each of shunt resistors is connected in parallel with source terminal of second switch transistor corresponding to each LED string.

16. The display device as claimed in claim 15, characterized in that ration of resistance of shunt resistor and saturated conductive impedance of second switch transistor is in the range of 0.5-2.

17. The display device as claimed in claim 15, characterized in that current detection module comprises equal number of detection resistors as number of LED strings, first end of each of detection resistors is connected to corresponding shunt resistor, and second end of each of detection resistors is grounded, wherein first end of each of detection resistors provides a current feedback signal of LED string.

18. The display device as claimed in claim 17, characterized in that the first switch transistor and the second switch transistor are N-channel MOS transistors.

19. The display device as claimed in claim 12, characterized in that control end of first switch transistor receives switch control PWM signal of LED string, and when switch control PWM signal of LED string is low, voltage at control terminal of first switch transistor is pulled down so that first switch transistor is off; when switch control PWM signal of LED string is high, voltage at control terminal of first switch transistor is pulled up so that first switch transistor is on.

20. The display device as claimed in claim 12, characterized in that the power source module is a BOOST circuit.

* * * * *